US009061406B2

(12) United States Patent
Cherry

(10) Patent No.: US 9,061,406 B2
(45) Date of Patent: Jun. 23, 2015

(54) TOOL FOR REMOVING REMNANT OF SPARK PLUG BOOT

(76) Inventor: Guy A. Cherry, Kalamazoo, MI (US)

( * ) Notice: Subject to any disclaimer, the term of this patent is extended or adjusted under 35 U.S.C. 154(b) by 1910 days.

(21) Appl. No.: 12/260,670

(22) Filed: Oct. 29, 2008

(65) Prior Publication Data

US 2010/0024208 A1 Feb. 4, 2010

Related U.S. Application Data

(60) Provisional application No. 61/085,528, filed on Aug. 1, 2008.

(51) Int. Cl.
*B23P 19/04* (2006.01)
*B25B 27/28* (2006.01)

(52) U.S. Cl.
CPC ........... *B25B 27/28* (2013.01); *Y10T 29/53952* (2015.01); *Y10T 29/53283* (2015.01)

(58) Field of Classification Search
CPC ........................... B23P 19/04; Y10T 29/53952
USPC ................... 29/764, 280, 705, 456, 278, 270; 81/53.12, 426.5, 424.5, 177, 125, 81/177.6, 177.1; 72/409.06, 409.14
See application file for complete search history.

(56) References Cited

U.S. PATENT DOCUMENTS 2,326,676 A * 8/1943 Peters ............................ 294/11
3,103,836 A * 9/1963 Bristol, III ...................... 29/764
3,134,574 A * 5/1964 Reuterfors ...................... 254/25
3,174,216 A * 3/1965 Hamilton ........................ 29/235
3,788,168 A * 1/1974 Steinmann, Jr. ............... 81/15.9
4,096,618 A * 6/1978 Perline et al. ................... 29/278
4,125,938 A * 11/1978 Clark ............................. 29/764
4,202,088 A * 5/1980 Hansen ........................... 29/280
4,240,192 A * 12/1980 Davis ........................... 29/426.6
4,425,697 A * 1/1984 Simmons ........................ 29/280
5,014,409 A * 5/1991 Hippach ......................... 29/267
5,035,038 A * 7/1991 Streett ............................ 29/270
5,074,173 A * 12/1991 Cearley ........................ 81/177.6
5,075,960 A * 12/1991 Smith ............................. 29/739
5,253,408 A * 10/1993 Wright ............................ 29/280
5,455,997 A * 10/1995 Nasiell ............................ 29/456
5,464,421 A * 11/1995 Wortrich ....................... 606/213
5,514,314 A 5/1996 McDougal
5,593,197 A 1/1997 Mathieu et al.
5,680,697 A 10/1997 Bever
5,778,720 A * 7/1998 Olexa, Jr. ........................ 72/325
6,003,914 A * 12/1999 Brisbin ........................... 294/26
6,886,229 B1 * 5/2005 Wilson ............................ 29/267
7,243,419 B2 7/2007 Cheng
8,479,367 B2 * 7/2013 Hurley et al. ................ 29/426.6
8,713,773 B2 * 5/2014 Foxx et al. ...................... 29/270
2011/0016688 A1 * 1/2011 Townsend .................... 29/426.5

* cited by examiner

*Primary Examiner* — Peter DungBa Vo
*Assistant Examiner* — Kaying Kue
(74) *Attorney, Agent, or Firm* — Price Heneveld LLP

(57) ABSTRACT

A tool facilitates removing a remnant piece of rubber/insulating material on a spark plug located in a deep engine recess, where the piece is a remnant portion (e.g., a ring portion) of an insulating boot from a conductor assembly formerly attached to a top of the spark plug, but where the remnant portion tore away upon removal of the boot. The tool includes a long shaft, a handle, and a tip configured to slip between or under the remnant piece and the spark plug, where it can be partially rotated to slip under or bite into the piece to forcibly pull the piece out of the recess. The tip includes a sharp corner and a chamfered corner adapted to physically dig into (or slip under) the remnant piece upon the partial rotation of the shaft. A related method is also disclosed. The tool can be a strip of 3⁄16"×1⁄32" steel, such as an oil dipstick.

10 Claims, 3 Drawing Sheets

TOOL FOR REMOVING REMNANT OF SPARK PLUG BOOT

This application claims the benefit under 35 U.S.C. §119(e) of provisional application Ser. No. 61/085,528, filed Aug. 1, 2008, entitled "TOOL FOR REMOVING REMNANT OF SPARK PLUG BOOT."

BACKGROUND

The present invention relates to a tool useful for removing remnant pieces of spark plug boots which occasionally beak off when the boot is removed.

Sparks plugs on combustion engines must periodically be removed and cleaned (or replaced). However, problems occur in removing spark plugs. For example, the spark plugs are often located within a tube or deep cylindrical hole, making it difficult to access and remove the spark plug. This location also makes it difficult to even disconnect and remove the protective insulating boot and electrical conductor connected to a top of the spark plug. Part of the reason is because of the small clearance around the boot (i.e., limited access to grip the boot), and a tendency of the boot to literally suction onto and/or bond to a top of the spark plug. Part of the reason is because oil and foreign matter get into the tube adjacent the boot, causing the boot to literally bake onto the spark plug when the engine gets hot. As a result, the act of removing the boots often tears them, thus leaving a remnant piece or even a remnant ring (such as about ¼" to ½" in length) on the spark plug. The remnant piece makes it difficult to engage the hex shoulder of a spark plug to unscrew and remove it. I have found that this problem is particularly common (and aggravating) in some vehicles, including passenger cars, trucks, marine vehicles, and motorcycles, such as recent model Toyota Camrys, Saturns, Ford Triton V-8s, 2004 Kawasaki 800 & 1500 model motorcycles, and some boats.

U.S. Pat. No. 4,202,088 discloses a tool for pulling the lead wires from engine spark plugs, the tool having a forked bottom. The present invention is not for pulling lead wires from engine spark plugs but rather for removing remnant pieces of the spark plug boot when they break off. In addition, the present invention does not have a forked bottom.

U.S. Pat. No. 4,425,697 discloses a device for removing a boot from a spark plug which requires 4 elements. The tool of the present invention requires only one element. The device of U.S. Pat. No. 4,425,697 will not do what the tool of the present invention does.

U.S. Pat. No. 5,593,197 discloses a spark plug wire pulling tool requiring 7 elements and does not do what the tool of the present invention does. Further, the tool of the present invention has only one element.

U.S. Pat. No. 5,680,697 discloses a spark terminal removal tool requiring 5 elements and does not do what the tool of the present invention does. Further, the tool of the present invention has only one element.

U.S. Pat. No. 7,243,419 discloses a spark plug boot removal tool requiring 4 elements and does not do what the tool of the present invention does. Further, the tool of the present invention has only one element.

None of the above inventions are capable of removing the remnant pieces of spark plug boots that the present invention can do.

SUMMARY OF THE PRESENT INVENTION

In one aspect of the present invention, a tool is provided for removing a remnant piece of material on a spark plug located in a difficult to access location on an engine, where the remnant piece is a portion of an insulating boot from a conductor assembly formerly attached to a top of the spark plug, and where the location is a deep recess defining a small clearance around the piece. The tool includes a stiff long shaft, a handle at one end for partially rotating the shaft and then pulling the long shaft, and a tip. The tip is configured to slip into a position adjacent the remnant piece, and has a protruding portion for digging into or slipping under the remnant piece upon the partial rotation of the shaft and for pulling the remnant piece as the shaft is pulled out of the deep recess.

In another aspect of the present invention, a method is provided for removing a remnant piece of material on a spark plug located in a difficult to access location on an engine, where the remnant piece is a portion of an insulating boot from a conductor assembly formerly attached to a top of the spark plug, and where the location is a deep recess defining a small clearance around the piece. The method includes steps of providing a tool with a stiff long shaft and a tip, extending the long shaft into the deep recess and slipping the tip into a position adjacent the remnant piece, manipulating the tip to dig a protruding portion of the tip into or under the remnant piece, and pulling the remnant piece out of the deep recess by pulling on the shaft.

In a narrower aspect, the step of manipulating the tip includes partial rotation of the shaft to cause the tip to bite into the remnant piece. In another aspect, the step of extending includes fitting the tip between the remnant piece and a top of spark plug prior to partial rotation thereof.

An object of the present invention is to provide an exceptionally simple and easy to use tool from a readily available existing part, such as a dipstick.

An object of the present invention is to provide an exceptionally simple and easy tool that is intuitive to use.

These and other aspects, objects, and features of the present invention will be understood and appreciated by those skilled in the art upon studying the following specification, claims, and appended drawings.

BRIEF DESCRIPTION OF DRAWINGS

FIG. 3A is an enlarged end view identical to FIG. 3.

DETAILED DESCRIPTION OF PREFERRED EMBODIMENTS

Figure 1:
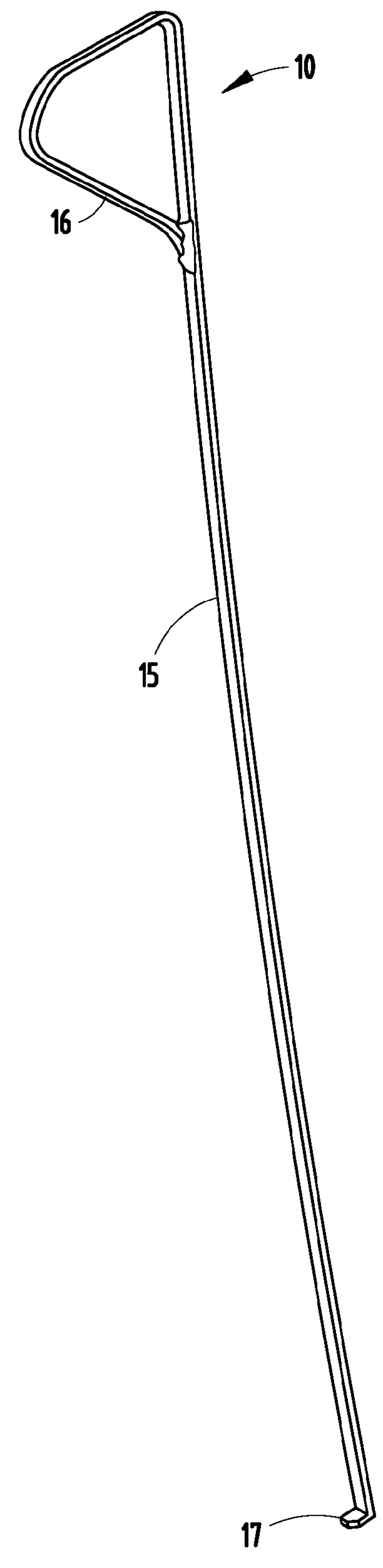
FIGS. 1-3 are side, front, and lower end views of the present tool.
Figure 2:
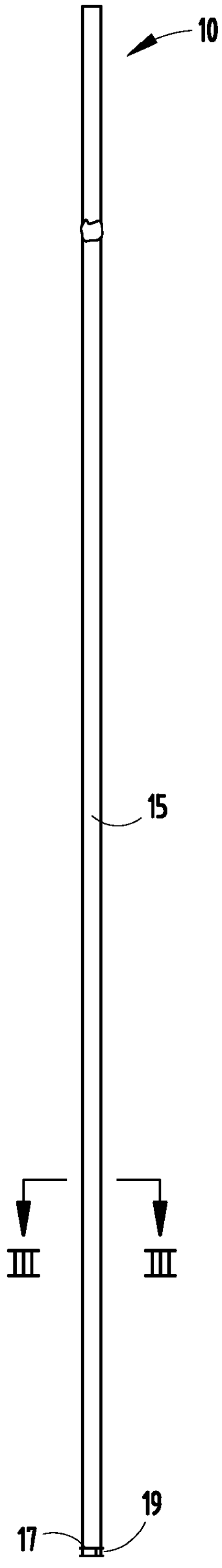
Figure 3:
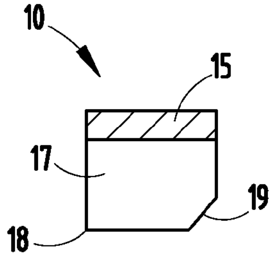
Figure 4:
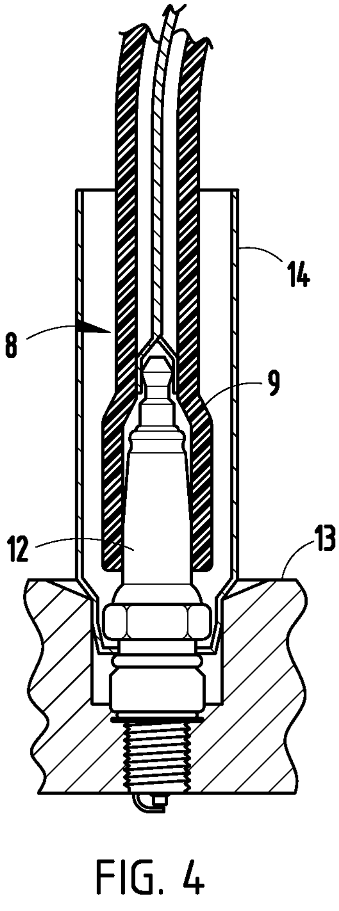
FIG. 4 is a side cross-sectional view showing a spark plug in a combustion engine with an electrical conductor assembly including a boot insulating/covering the electrical connector thereof.
Figure 5:
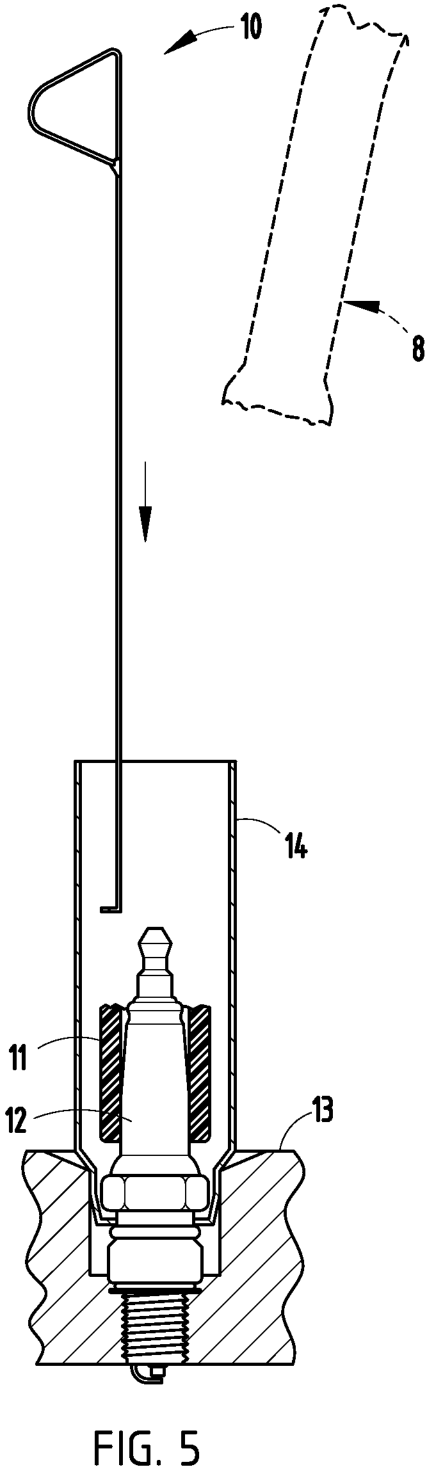
FIG. 5 is a side cross-sectional view similar to FIG. 4, but with the electrical conductor assembly removed, except for a remnant piece (e.g., a lower ring) of the boot torn away and left behind . . . and showing the present tool positioned for use.

The present tool 10 (FIG. 1-3) facilitates removing a remnant piece of material (e.g., ring 11) of rubber/insulating material on a spark plug 12, where the spark plug 12 is located in a difficult to access location on an engine 13. In FIG. 3, the spark plug 12 is located deep inside and near a bottom end of a metal tube 14 (or other obstruction on the vehicle), at a location where its sparking end is optimally positioned to ignite the gasses within the cylinder bore of a combustion engine. The illustrated remnant piece 11 is a remaining ring portion of an insulating boot 9 from a conductor assembly 8 formerly attached to a top of the spark plug 12, but where the piece 11 tore away from the boot 9 when the conductor assembly 8 was pulled away from the spark plug 12 (i.e., in anticipation of removing the spark plug 12 for maintenance). Notably, the illustrated arrangement is a metal tube, however the present tool can also be used on engines where the spark plug 12 is positioned in a deep recess formed in a cylinder head or other metal structure of the engine 13, where the location is a deep recess defining a small clearance around the piece 11. Also, the present tool can be used to remove any interfering piece of material, even if something other than a piece of the boot.

Figure 6:
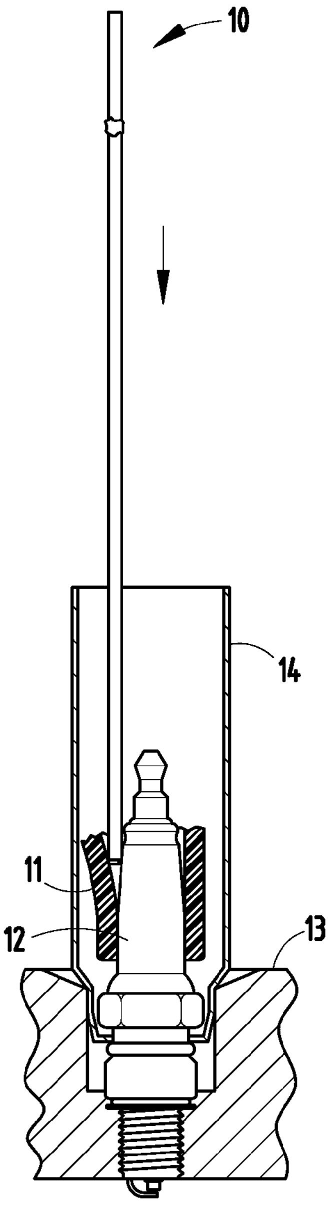
FIGS. 6-8 are side cross-sectional views similar to FIG. 5, with FIG. 6 showing the tool extended into engagement with the remnant piece of the boot, FIG. 7 showing the tool rotated to bite into the remnant piece, and FIG. 8 showing the tool pulled to remove the remnant piece from the spark plug.
Figure 7:
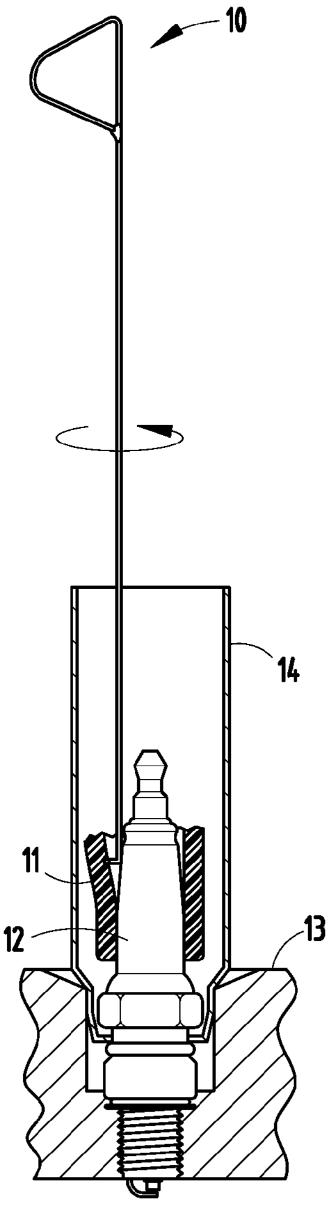
Figure 8:
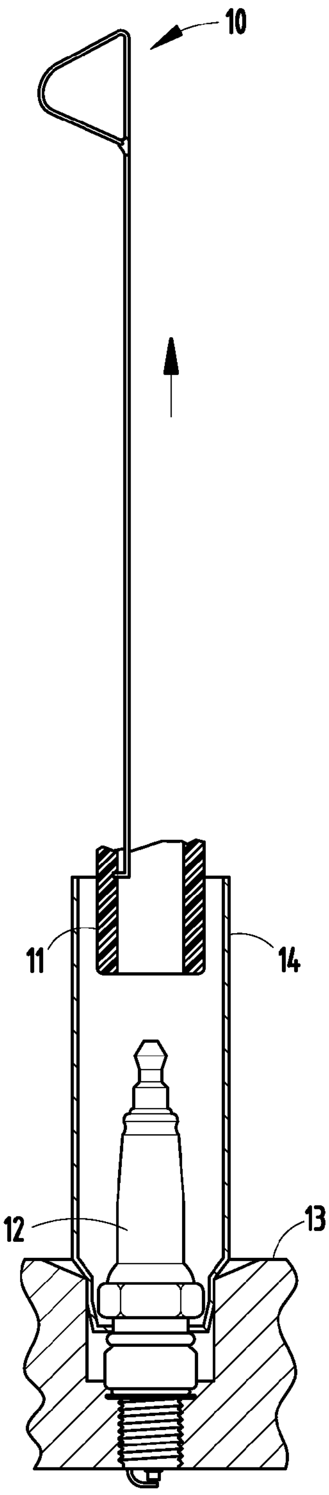

The tool 10 includes a stiff long shaft 15, a handle 16 (such as a triangle formed integrally from the material of the strip) at one end for partially rotating the shaft 15 and then pulling the long shaft 15, and a perpendicular tip 17. The illustrated tool 10 is made from a steel strip of material commonly used for an existing oil dipstick, but it is contemplated that other materials and shapes can be used. The tip 17 is relatively small and generally rectangular or square in shape, and is configured to slip into a position adjacent the remnant piece 11 (FIG. 6), such as between the remnant piece 11 and a top of the spark plug 12. The tip 17 includes at least one relatively sharp corner 18 defining a protruding portion adapted to physically dig into or under the remnant piece 11 upon the partial rotation of the shaft 15 (FIG. 7) and further includes a second chamfered corner 19 for slipping under (or digging into) the remnant ring 11. Notably, the chamfered corner 19 can provide an increased surface area that may be useful in removing the piece 11. The tool 10 can then be pulled to rip the piece 11 out of the deep recess (FIG. 8).

The present invention includes a related method for removing a remnant piece 11 of material on a spark plug 12 located in a difficult to access location on an engine 13, where the remnant piece 11 (or ring) is a portion of an insulating boot 9 from a conductor assembly 8 formerly attached to a top of the spark plug 12, and where the location is a deep recess defining a small clearance around the piece 11. The method includes steps of providing a tool 10 with a stiff long shaft 15 and a tip 17, extending the long shaft 15 into the deep recess and slipping the tip 17 into a position adjacent the remnant piece 11, manipulating the tip 17 to move a protruding sharp corner 18 of the tip 17 into or under the remnant piece 11, and pulling the remnant piece 11 out of the deep recess by pulling on the shaft 15.

In a preferred form, the step of manipulating the tip 7 includes partial rotation of the shaft 15 to cause the tip 17 to bit into the remnant piece 11. The step of extending also includes fitting the tip 17 between the remnant piece 11 and a top of spark plug 12 prior to partial rotation thereof. A preferred size of the strip forming the shaft 15 and tip 17 is less than about ¼" wide and less than about 1/16" thick, and more preferably is about 3/16" wide and about 1/32" thick, with the strip having a total length of 6" to 12" long. For example, the shaft, handle and tip can be made from a strip simulating the cross sectional size, stiffness and material of an oil dipstick for an engine.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A tool for removing a remnant piece of material on a spark plug located in a difficult to access location on an engine, where the remnant piece is a portion of an insulating boot from a conductor assembly formerly attached to a top of the spark plug, and where the location is a deep recess defining a small clearance adjacent the remnant piece, comprising:
- a stiff long shaft;
- a handle at one end for partially rotating the shaft and then pulling the long shaft; and
- a tip configured to slip into a position adjacent the remnant piece, the tip having a protruding sharp portion for digging into the remnant piece upon the partial rotation of the shaft and for pulling the remnant piece as the shaft is pulled out of the deep recess.

2. The tool of claim 1, wherein the tip is configured to fit between the remnant piece and the top of the spark plug.

3. The tool of claim 1, wherein the sharp portion includes a relatively pointed area adapted to cut and bite into the remnant piece upon the partial rotation.

4. The tool of claim 1, wherein the tip defines a generally rectangular shape.

5. The tool of claim 1, wherein the shaft and the tip are made from a continuous steel strip of material.

6. The tool of claim 5, wherein the steel strip has cross section that is less than about ¼" wide and less than about 1/16" thick.

7. The tool of claim 6, wherein the steel strip has a cross section that is about 3/16" wide and about 1/32" thick and has a total length of 6" to 12" long.

8. The tool of claim 1, wherein the shaft, the handle and the tip are made from a strip simulating the cross-sectional size, stiffness and material of an oil dipstick for an engine.

9. A tool for removing a remnant piece of material on a spark plug located in a difficult to access location on an engine, where the remnant piece is a portion of an insulating boot from a conductor assembly formerly attached to a top of the spark plug, and where the location is a deep recess defining a small clearance adjacent the remnant piece, comprising:
- a stiff long shaft;
- a handle at one end for partially rotating the shaft and then pulling the long shaft; and
- a recessless tip configured to slip into a position adjacent the remnant piece, the tip having a protruding portion for digging into the remnant piece upon the partial rotation of the shaft and for pulling the remnant piece as the shaft is pulled out of the deep recess but not having a recess for receiving the spark plug.

10. A tool for removing a remnant piece of material on a spark plug located in a difficult to access location on an engine, where the remnant piece is a portion of an insulating boot from a conductor assembly formerly attached to a top of the spark plug, and where the location is a deep recess defining a small clearance adjacent the remnant piece, comprising:
- a single continuous strip of metal having interconnected portions forming a stiff long shaft, a handle, and a tip;
- the handle being at one end of the shaft and adapted for gripping to partially rotate the shaft and then to pull on the long shaft; and
- the tip being configured to slip into a position adjacent the remnant piece, the tip having a protruding portion for digging into the remnant piece upon the partial rotation of the shaft and for pulling the remnant piece as the shaft is pulled out of the deep recess.

* * * * *